(No Model.)
F. S. HEISER.
GAME COUNTER.
No. 282,725. Patented Aug. 7, 1883.
Fig: 1. Fig: 2.
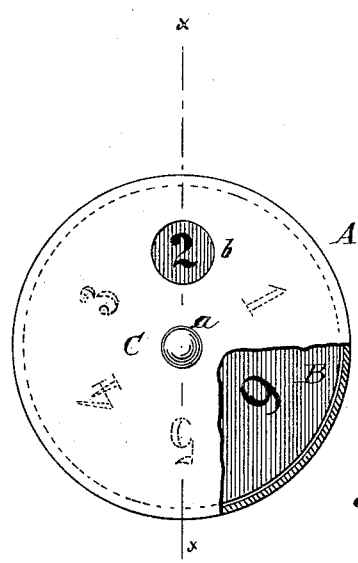
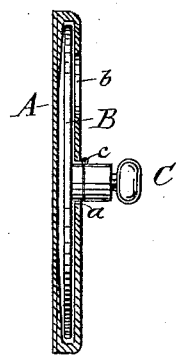
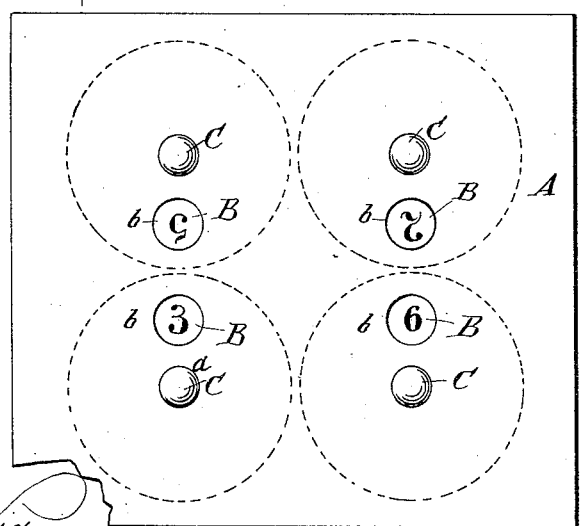
Fig: 3.
WITNESSES:
Chas. Nida
C. Sedgwick
INVENTOR:
F. S. Heiser
BY Munn & Co.
ATTORNEYS.

UNITED STATES PATENT OFFICE.

FREDERICK S. HEISER, OF NEW YORK, N. Y.

GAME-COUNTER.

SPECIFICATION forming part of Letters Patent No. 282,725, dated August 7, 1883.

Application filed November 9, 1882. (No model.)

*To all whom it may concern:*

Be it known that I, FREDERICK S. HEISER, of the city, county, and State of New York, have invented a new and Improved Game-Counter, of which the following is a full, clear, and exact description.

The object of my invention is to provide a cheap, simple, and convenient device for registering the count in table-games, in which the employment of mechanism to operate the dial, and liable to be broken or get out of order, as well as the mechanism to hold the dial in any position when revolved, is dispensed with; and to these ends my invention consists of one or more numbered disks inclosed in a casing of leather or other suitable fibrous material, each disk being provided with a central hinged stem projecting through a hole in the casing, by which it may be revolved by hand for bringing the numbers thereon successively to view through a suitable opening in the casing, the friction of the casing with the disk holding the latter in any desired position, and the employment of mechanism to operate the disk being entirely dispensed with, as hereinafter more fully set forth, and pointed out in the claim.

Reference is to be had to the accompanying drawings, forming part of this specification, in which similar letters of reference indicate corresponding parts in all the figures.

Figure 1 is a broken plan view of my new and improved game-counter employing a single disk. Fig. 2 is a sectional elevation of the same, taken on the line $x\ x$ of Fig. 1; and Fig. 3 is a plan view of a counter in which four disks are used.

When a single disk is used, the casing A is made circular in form, and will have the central opening, $a$, and side opening, $b$, made in its upper side, as shown. The disk B will also be round, and will have numbers printed, engraved, or stamped upon it the same distance from its center that the opening $b$ is from the center of the casing A, so that upon turning the disk the numbers will come immediately under the opening $b$, in full view, as illustrated in Fig. 1. For turning the disk by hand without the employment of any mechanism, the same will be provided with the central stem, button, or attachment, C, which protrudes from the central opening, $a$, of the casing, as shown. The material of the disk may be card-board, metal, or any other suitable material; and instead of using the plain button or stem C for turning the disk, this stem may be of some ornamental or useful design; or it may be a flat plate of suitable size, and hinged, as shown, at $c$, Fig. 2.

I am aware that a register or game-counter consisting of a metallic casing inclosing a numbered dial-plate made to revolve by means of operating a rod passing through an aperture in the handle of the casing, a spring-pawl and a ratchet-wheel secured to the dial-plate, so as to bring the numbers on the face of the latter successively opposite an opening in the casing, the dial-plate being held in any desired position by means of a second ratchet-wheel and spring-pawl, have heretofore been employed, and I therefore lay no claim to such construction. In my invention I dispense entirely with the mechanism for revolving the dial plate or disk, and also the mechanism for holding the disk in any desired position, the disk being readily revolved by hand and held in any desired position by the friction of the disk with the casing, thus rendering the construction simpler, cheaper, and less liable to get out of order, while the hinging of the stem so that its upper part can be thrown flat upon the casing enables the game-counter to be carried more conveniently in the pocket.

In Fig. 3 the casing A is made square in form, and is provided with four disks, B, and is formed with openings $a$ and $b$, to correspond. The disks are each provided with the stems or buttons C, the same as the single disk in Figs. 1 and 2, and are numbered in units and tens, or in any other suitable manner to suit the game for which the counter is intended.

Thus constructed, it will be seen that the counter may be made very cheap, and that the device is very convenient for its purpose.

Having thus described my invention, what I claim as new, and desire to secure by Letters Patent, is—

In a game-counter, the combination, with the casing A, having the central hole, $a$, and orifice $b$, of the disk B, inclosed in said casing, and provided with the central stem, C, adapted to be revolved by hand, hinged at c, and passing through the central hole, a, the said disk having a series of numerals arranged on its upper face in the circumference of a circle at the same distance from its center as the orifice b in the casing is, substantially as described, whereby mechanism for revolving the disk and holding it in any desired position is dispensed with, as set forth.

FREDERICK S. HEISER.

Witnesses:
H. A. WEST,
C. SEDGWICK.